(12) United States Patent
Kita

(10) Patent No.: US 8,704,913 B2
(45) Date of Patent: Apr. 22, 2014

(54) IMAGE RECORDING APPARATUS, IMAGE RECORDING METHOD, AND STORAGE MEDIUM STORING PROGRAM, FOR USE IN RECORDING SHOT IMAGES

(75) Inventor: Kazunori Kita, Nishitama-gun (JP)

(73) Assignee: Casio Computer Co., Ltd., Tokyo (JP)

( * ) Notice: Subject to any disclaimer, the term of this patent is extended or adjusted under 35 U.S.C. 154(b) by 51 days.

(21) Appl. No.: 13/418,640

(22) Filed: Mar. 13, 2012

(65) Prior Publication Data

US 2012/0236176 A1 Sep. 20, 2012

(30) Foreign Application Priority Data

Mar. 15, 2011 (JP) .................................. 2011-056682

(51) Int. Cl.
*H04N 5/76* (2006.01)

(52) U.S. Cl.
USPC ................... 348/231.2; 348/231.3; 348/231.5

(58) Field of Classification Search
CPC . H04N 5/772; H04N 1/32128; H04N 1/2112; H04N 5/907
USPC .................... 348/231.2, 231.3, 231.5, 231.99
See application file for complete search history.

(56) References Cited

U.S. PATENT DOCUMENTS

| | | | |
|---|---|---|---|
| 6,437,797 B1 * | 8/2002 | Ota .............................. | 345/638 |
| 2004/0064339 A1 | 4/2004 | Shiota et al. | |
| 2006/0221779 A1 * | 10/2006 | Matsushita et al. ........ | 369/30.01 |
| 2007/0101247 A1 * | 5/2007 | Matsuki et al. .............. | 715/500 |
| 2007/0165968 A1 * | 7/2007 | Terayoko ..................... | 382/305 |
| 2008/0089592 A1 * | 4/2008 | Isomura ....................... | 382/224 |
| 2009/0116752 A1 * | 5/2009 | Isomura et al. .............. | 382/217 |

FOREIGN PATENT DOCUMENTS

| | | | |
|---|---|---|---|
| JP | 2003-058867 A | | 2/2003 |
| JP | 2003-099434 A | | 4/2003 |
| JP | 2005-107867 A | | 4/2005 |
| JP | 2006-323621 A | | 11/2006 |
| JP | 2007-194948 A | | 8/2007 |
| JP | 2009267784 A | * | 11/2009 |

* cited by examiner

*Primary Examiner* — Tuan Ho
*Assistant Examiner* — Zhenzhen Wu
(74) *Attorney, Agent, or Firm* — Holtz, Holtz, Goodman & Chick, PC

(57) ABSTRACT

A map range determination unit determines a map range that includes all of the shooting locations of the image data items selected by the image selection unit. A map image creation unit creates a map image of a map range determined by the map range determination unit based on the map information. A superimposition unit superimposes symbols representing the shooting locations of the image data items selected by the image selection unit on a map image created by the map image creation unit. A index page insertion unit inserts a map image on which symbols have been superimposed by the superimposition unit into the electronic photo album in the form of an index page of the electronic photo album.

21 Claims, 7 Drawing Sheets

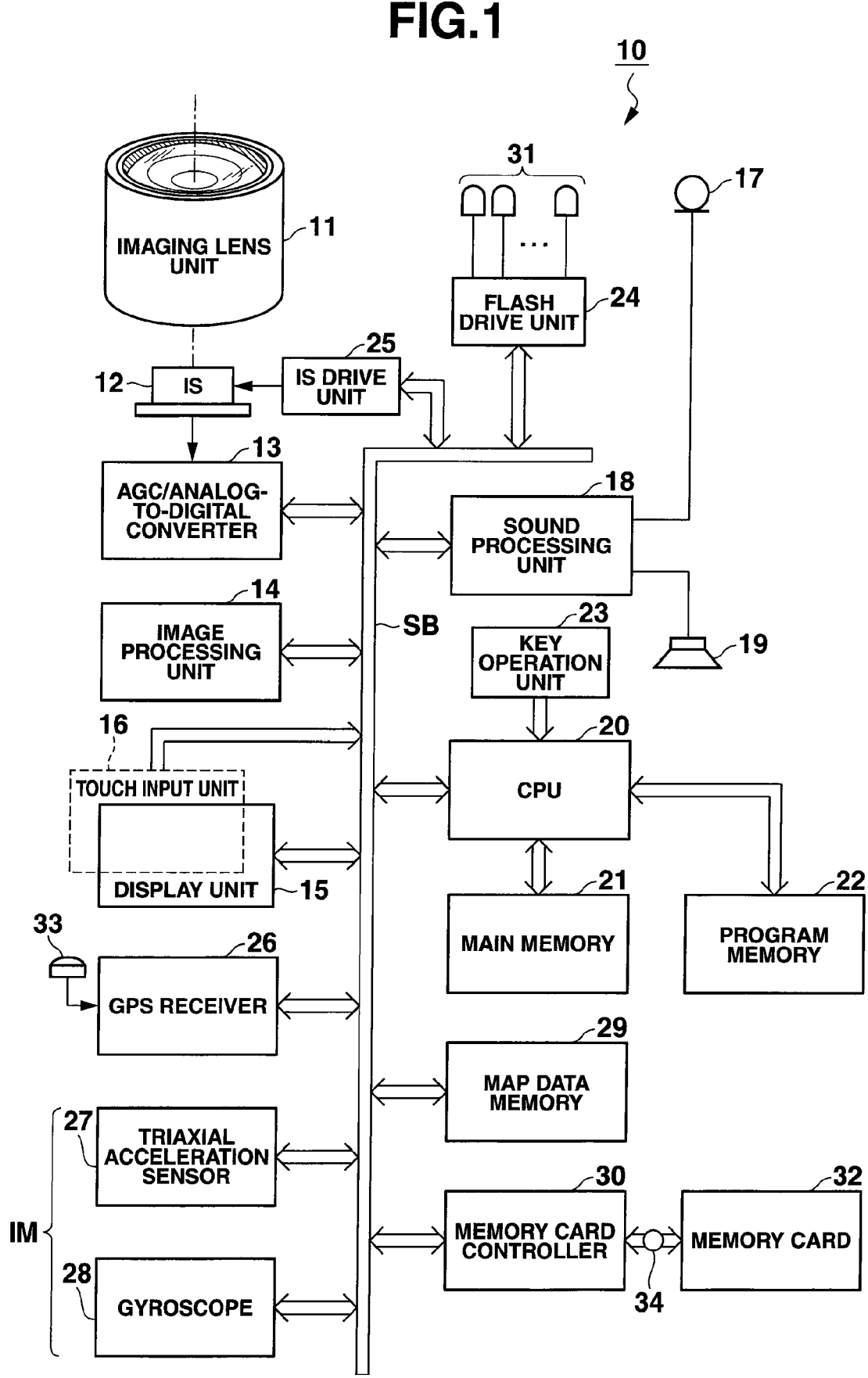

IMAGE RECORDING APPARATUS, IMAGE RECORDING METHOD, AND STORAGE MEDIUM STORING PROGRAM, FOR USE IN RECORDING SHOT IMAGES

CROSS-REFERENCE TO RELATED APPLICATIONS

This application is based upon and claims the benefit of priority from prior Japanese Patent Application No. 2011-056682, filed Mar. 15, 2011, the entire contents of which are incorporated herein by reference.

BACKGROUND OF THE INVENTION

1. Field of the Invention

The present invention relates to an image recording apparatus, an image recording method, and a storage medium storing a program, suitable for, for example, a digital camera configured to record shot images to which shooting location information is added.

2. Description of the Related Art

Various apparatuses have been proposed which collect image data items obtained by shooting into folders suitably on the basis of shooting dates and times, Global Positioning System (GPS) information, and others stored in such a manner that they are related to the data items and organize the folders into an electronic photo album (e.g., Jpn. Pat. Appln. KOKAI Publication No. 2005-107867).

Many conventional electronic photo album devices, including the one disclosed in the above patent document, adopt a method of collecting and classifying image data items in an integrated manner on the basis of, for example, shooting dates and times or shooting locations and then organizing the data items into a photo album after the classification.

Therefore, a part may have many image data items recorded in it and another part have no image data item recorded in it at all, depending on a date, a place, or the like. Even in the same place, image data items completely differing in date may be mixed. In such a case, collection of images to be displayed might be biased, and/or collected image data items might be unnaturally displayed. Since the image data items are organized into a photo album on the basis of results of collection, a connection between the previous and next images might not be understood from the created photo album.

It is thus desired to provide an image recording apparatus, an image recording method, and a storage medium storing a program, with improved user-friendliness, for example, capable of retrieving a desired image efficiently even from a large number of recorded images, through a natural and comprehensible manner of collection of the images.

BRIEF SUMMARY OF THE INVENTION

According to one aspect of the present invention, there is provided an image recording apparatus comprising: an image recording unit configured to record a plurality of image data items to which shooting information containing shooting locations is added; an image selection unit configured to select, from the image recording unit, a plurality of image data items to be used in creating an electronic photo album; an electronic photo album creation unit configured to arrange each of the image data items selected by the image selection unit on any one of a plurality of pages included in the electronic photo album to create an electronic photo album; a map storage unit configured to store map information; a map range determination unit configured to determine a map range that includes all of the shooting locations of the image data items selected by the image selection unit; a map image creation unit configured to create a map image of a map range determined by the map range determination unit based on the map information; a superimposition unit configured to superimpose symbols representing the shooting locations of the image data items selected by the image selection unit on a map image created by the map image creation unit; and an index page insertion unit configured to insert a map image on which symbols have been superimposed by the superimposition unit into the electronic photo album in the form of an index page of the electronic photo album.

According to another aspect of the present invention, there is provided an image recording method applied to an image recording apparatus including an image recording unit configured to record a plurality of image data items to which shooting information containing shooting locations is added and a map storage unit configured to store map information, the method comprising: executing an image selection process of selecting, from the image recording unit, a plurality of image data items to be used in creating an electronic photo album; executing an electronic photo album creation process of arranging each of the image data items selected by the image selection process on any one of a plurality of pages included in the electronic photo album to create the electronic photo album; executing a map range determination process of determining a map range that includes all of the shooting locations of the image data items selected by the image selection process; executing a map image creation process of creating a map image of a map range determined by the map range determination process based on the map information; executing a superimposition process of superimposing symbols representing the shooting locations of the image data items selected by the image selection process on a map image created by the map image creation process; and executing an index page insertion process of inserting a map image on which symbols have been superimposed by the superimposition process into the electronic photo album in the form of an index page of the electronic photo album.

According to still another aspect of the present invention, there is provided a non-transitory computer-readable storage medium having program code stored thereon for controlling a computer operable as an image recording apparatus including an image recording unit configured to record a plurality of image data items to which shooting information containing shooting locations is added and a map storage unit configured to store map information, the program code comprising: executing an image selection process of selecting, from the image recording unit, a plurality of image data items to be used in creating an electronic photo album; executing an electronic photo album creation process of arranging each of the image data items selected by the image selection process on any one of a plurality of pages included in the electronic photo album to create the electronic photo album; executing a map range determination process of determining a map range that includes all of the shooting locations of the image data items selected by the image selection process; executing a map image creation process of creating a map image of a map range determined by the map range determination process based on the map information; executing a superimposition process of superimposing symbols representing the shooting locations of the image data items selected by the image selection process on a map image created by the map image creation process; and executing an index page insertion process of inserting a map image on which symbols have been superimposed by the superimposition process into the electronic photo album in the form of an index page of the electronic photo album.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a functional configuration of a digital camera according to an embodiment of the invention;

FIGS. 5B-1, 5B-2, 5B-3, 5B-4, 5B-5, 5B-6, and 5B-7 show examples of image pages constituting an electronic photo album created after group setting in the embodiment;

FIG. 6 is a flowchart to explain a hierarchical classification process performed on an electronic photo album in the embodiment; and FIG. 7 is a flowchart to explain the process of displaying the created electronic photo album in the embodiment.

DETAILED DESCRIPTION OF THE INVENTION

Hereinafter, referring to the accompanying drawings, an embodiment when the invention is applied to a digital camera will be explained.

Figure 5A:
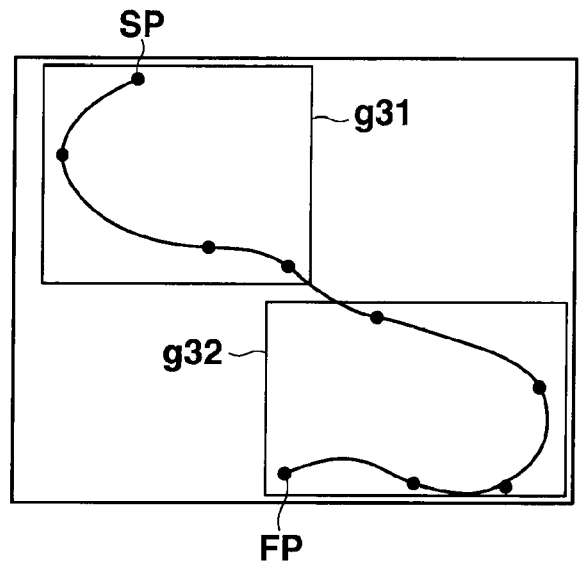
FIG. 5A shows an example of group setting in creating an electronic photo album in the embodiment.
Figures 1, 5B:
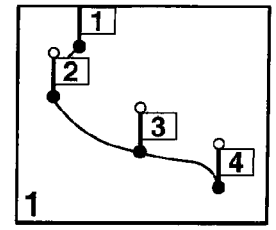
Figures 2, 5B:
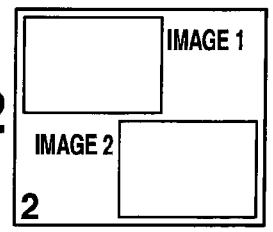
Figures 3, 5B:
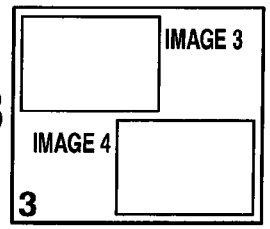

FIG. 1 shows a circuit configuration of a digital camera 10 according to the embodiment. In FIG. 1, an imaging lens unit 11 provided at the front of a camera housing forms an image by casting an optical image of a subject on the imaging surface of a solid-state image sensing device, such as a CMOS image sensor (IS) 12.

In a monitoring state called a through image display or a live view image display, an image signal obtained by imaging with the CMOS image sensor 12 is sent to an AGC/analog-to-digital converter 13. The AGC/analog-to-digital converter 13 digitizes an analog image signal by subjecting the image signal to correlation square sampling, automatic gain adjustment, and analog-to-digital conversion. The digitized image data is sent to an image processing unit 14 via a system bus SB.

The image processing unit 14 subjects image data to a necessary image process as needed. Specifically, the image processing unit 14 subjects image data (hereinafter, referred to as RAW data) corresponding to the configuration of a Bayer-arrangement color filter included in the CMOS image sensor 12 to a digital development process. Specifically, the digital development process converts RAW data into image data in a luminance-color-difference (YUV) system by subjecting the RAW data to a de-mosaic process, including a pixel interpolation process, a gamma correction process, and a matrix operation.

The image processing unit 14 creates image data by decreasing considerably the number of pixels and gradation bits from the developed image data for display and sends the created image data to a display unit 15 via a system bus SB. The display unit 15 displays a through image on the basis of the sent image data.

The display unit 15, which is provided on the back side of the camera housing, is composed of, for example, a color liquid-crystal panel with backlighting and its controller. A touch input unit 16 composed of a transparent conducting film is formed integrally in the upper part of the screen of the display unit 15.

When a user performs a touch operation on the surface of the touch input unit 16 with a finger or the like, the touch input unit 16 calculates the coordinate position touched and sends a calculated coordinate signal to a CPU 20 described later via the system bus SB.

Like the imaging lens unit 11, a microphone 17 is provided at the front of the camera housing. Sound in the direction of the subject is input to the microphone 17. The microphone 17 converts the input sound into an electrical signal and outputs the signal to a sound processing unit 18.

The sound processing unit 18 converts a sound signal input from the microphone 17 into digital data when only sound is recorded, when sound-added still images are shot, or when a moving image is filmed. In addition, the sound processing unit 18 not only detects the sound pressure level of digitized sound data, but also data-compresses the sound data in a specific data format, for example, in the Moving Picture Experts Group-4 Advanced Audio Coding (AAC) format, to form a sound data file and sends the file to a recording medium described later.

Moreover, the sound processing unit 18, which includes a sound source circuit for a PCM sound source or the like, decompresses a sound data file sent in reproducing sound into an analog signal to drive a speaker 19 provided on the back side of the housing of the digital camera 10, thereby making a sound.

The CPU 20, the system controller of the digital camera 10, performs overall control of the aforementioned circuits. The CPU 20 is directly connected to a main memory 21 and a program memory 22. The main memory 21, which is composed of, for example, an SRAM, functions as a work memory. The program memory 22, which is composed of an electrically rewritable nonvolatile memory, such as a flash memory, stores fixedly various operation programs, including one for creating an electronic photo album in a reproduction mode described later and various data items.

The CPU 20 reads necessary programs, data items, and others from the program memory 22 and performs overall control of the digital camera 10, while expanding the programs and data items suitably over the main memory 21 temporarily and storing the expanded programs and data items.

In addition, the CPU 20 performs control operations according to various key operation signals directly input from the key operation unit 23 and a coordinate signal corresponding to a touch operation on the touch input unit 16.

The key operation unit 23 includes, for example, a power key, a shutter release key, a zoom up/down key, a shooting mode key, a reproduction mode key, a menu key, cursor keys ("↑", "→", "↓", "←"), a set key, a cancel key, and a display key.

The CPU 20 is connected via the system bus SB not only to the AGC/analog-to-digital converter 13, image processing unit 14, display unit 15, touch input unit 16, and sound processing unit 18 but also to a flash drive unit 24, an image sensor (IS) drive unit 25, a GPS receiver 26, a triaxial acceleration sensor 27, a gyroscope 28, a map data memory 29, and a memory card controller 30.

The flash drive unit 24 receives a control signal from the CPU 20 when shooting a still image and drives a flash unit 31 composed of a plurality of high-intensity white LEDs in synchronization with shooting timing.

The image sensor drive unit 25 drives the CMOS image sensor 12 for scanning according to shooting conditions and the like set at the time.

The image processing unit 14 subjects image data sent from the AGC/analog-to-digital converter 13 to a de-mosaic process at the time of image shooting as a result of a shutter release operation of the key operation unit 23. Moreover, in the case of a specific data file format, such as Joint Photographic Experts Group (JPEG), the image processing unit 14 subjects the image data to a data compression process, such as discrete cosine transformation (DCT) or Huffman coding, thereby creating an image data file with a significantly reduced amount of data. The image processing unit 14 transfers the created image data file via the system bus SB and memory card controller 30 to the memory card 32, in which the image data file is recorded.

The image processing unit 14 receives image data read from the memory card 32 via the memory controller 30 in the reproduction mode through the system bus SB. The image processing unit 14 acquires image data of the original size by an expansion process of decompressing compression in the reverse of the procedure for recording the received image data, reduces the amount of the acquired image data, and then causes the resulting image data to be displayed on the display unit 15 via the system bus SB.

The GPS receiver 26 calculates three-dimensional information (latitude, longitude, altitude) on the present position and accurate current time on the basis of radiowaves from a plurality of GPS satellites (not shown) (at least four satellites in principle) received by a GPS antenna 33.

The triaxial acceleration sensor 27 is composed of, for example, a piezoresistive semiconductor acceleration sensor. The moving direction and acceleration of the digital camera 10 with hand movement correction in shooting can be detected on the basis of the output of the triaxial acceleration sensor 27.

In addition, the triaxial acceleration sensor 27 combines with the gyroscope 28 to constitute an inertial measurement unit IM. The gyroscope 28 detects an angular velocity from Coriolis force acting on, for example, a tuning-fork vibrating reed.

The CPU 20 determines a direction with the gyroscope 28 and an acceleration with the triaxial acceleration sensor 27 and integrates them, thereby calculating a speed as a result of the movement of the digital camera 10. In addition, the CPU 20 calculates a distance as a result of the movement of the digital camera 10 by integrating the speed.

Therefore, in a building, in a tunnel, or in a urban canyon sandwiched between high-rise buildings where radiowaves from GPS satellites cannot be received, the CPU 20 can obtain the present position continuously by an autonomous navigation by accumulating the output of the inertial measurement unit IM for three-dimensional information calculated on the basis of radio signals last received from a GPS satellite to update the contents.

The map data memory 29 stores map data items on major cities all over the world and various regions in Japan such that they are related to three-dimensional information. The map data items include topographic information, roads, buildings, leisure facilities, parks, notable sights, art museums, sightseeing facilities, shrines, Buddhist temples, various shops, accommodation facilities, rail stations, harbors, and airports.

The memory card controller 30 is connected to a memory card 32 installed in a card connector 34. The memory card 32, which is installed in the digital camera 10 detachably, is a recording medium of the digital camera 10 serving as a recording memory for image files or the like. The memory card 32 includes a nonvolatile memory, such as a flash memory, and a driving circuit for the memory.

Next, an operation of the embodiment will be explained.

The CPU 20 reads operation programs, data, and the like stored in the program memory 22, develops and stores them in the main memory 210, and then runs the operation programs, thereby realizing the operations described below.

The operation programs stored in the program memory 22, the map data stored in the map data memory 29, and the like have been stored before shipping from the manufacturing facilities of the digital camera 10. In addition, the operation programs, map data, and the like include new operation programs, control data including a map setting table, and map data that are installed from the outside by connecting the digital camera 10 with a personal computer (not shown) to upgrade, for example, the digital camera 10 or by temporarily installing a update-program-stored memory card 32 in the card connector 33.

Figure 2:
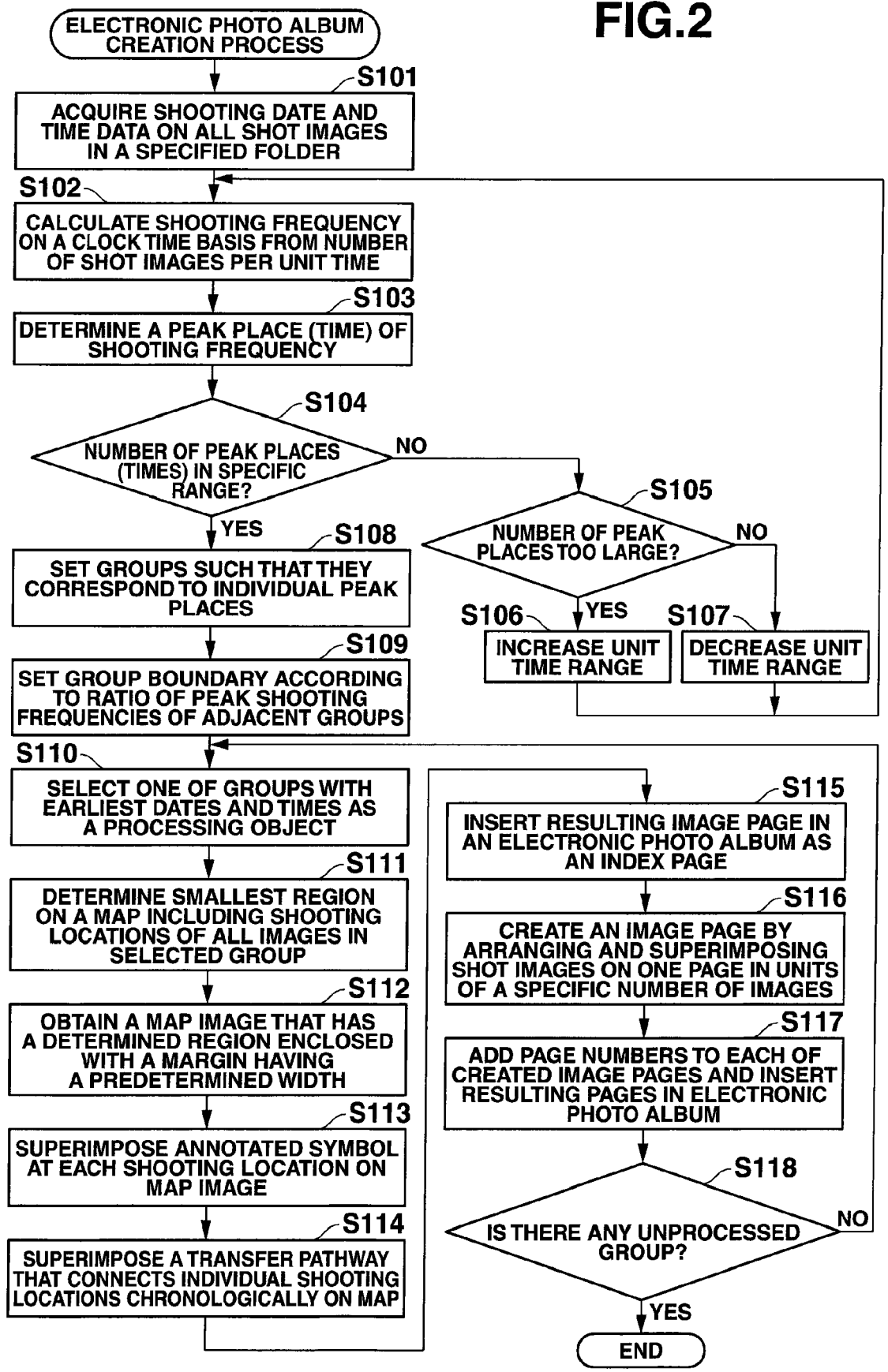
FIG. 2 is a flowchart to explain an electronic photo album creation process performed by specifying a data folder in a reproduction mode in the embodiment.

FIG. 2 is a flowchart to explain the contents of processing performed when an arbitrary image data folder is specified in the reproduction mode and the item "Creation of electronic photo album" is specified by operating the menu key, cursor keys, and set key of the key operation unit 23 suitably.

Suppose many image data items have been recorded in the memory card 32. Metadata including shooting dates and times and GPS information (latitude, longitude, altitude) representing shooting locations is added to each of the recorded image data items as data that represents shooting conditions according to, for example, the Exchangeable Image File (Exif) format standard.

As shown in FIG. 2, at the beginning of an electronic photo album creation process, the CPU 20 reads and obtains shooting-date-and-time data on all the image data items belonging to a specified image data folder recorded in the memory card 32 (step S101).

Then, the CPU 20 calculates the frequency of shooting per hour from the number of shot images per unit time on the basis of the obtained shooting-date-and-time data (step S102). For example, when the initial value of unit time is "2 hours," a histogram showing the number of shot images is created at intervals of two hours from the shooting time data, thereby calculating the number of shot images on a time zone basis.

The CPU 20 determines the number of places where the number of shot images has peaked, or the number of peaks in the histogram, on the basis of the distribution of the created histogram (step S103). The CPU 20 determines whether the number of peak places n (n being a natural number) is within a preset range, for example, within a range of $5 \leq n \leq 10$ (step S104).

If having determined that the number of peak places is not within the preset range, the CPU 20 further determines whether the number of peak places is larger or smaller than the preset range (step S105).

If having determined that the number of peak places is larger than the preset range, the CPU 20 increases the unit time range used up to that time by one level (step S106). In this case, if the time range until then is "2 hours," it is increased to "2 hours and 30 minutes."

If having determined that the number of peak places determined in step S105 is not larger than the preset range, the CPU 20 decreases the unit time range used up to that time by one level because the number of peak places is smaller than the preset range (step S107). In this case, for example, if the time range used until then is "2 hours," it is decreased to "1 hour and 30 minutes."

After having adjusted the unit time range in step S106 or step S107, the CPU 20 returns to the process in step S102 on the basis of the adjusted unit time range.

The CPU 20 adjusts the unit time range this way as needed, calculates the frequency of shooting on a time basis from the number of shot images per unit time, and causes the number of peak places to lie within the preset range.

When the number of peak places lies within the preset range, the CPU 20 determines that in step S104 and then sets an image data group to each of the peak places (step S108).

In this case, if a time zone when the number of shot images is zero is sandwiched between two adjacent peak places, the image data is divided into groups, using the time zone when the number is zero as a boundary.

In addition, as for a part where there is no time zone when the number of shot image is zero and time zones when the number of shot images is at least one succeed one another between two peak places, the CPU 20 sets a boundary position between two groups such that the time range is proportional to the frequency of shooting at the two peak places (step S109).

In this case, the CPU 20 performs setting such that the group range (time range) becomes larger as the frequency of shooting is larger. Therefore, if the values at the two peak places are equal, the boundary position between the two groups falls on the date and time at the midpoint between shooting dates and times at the two peak places.

Figure 3:
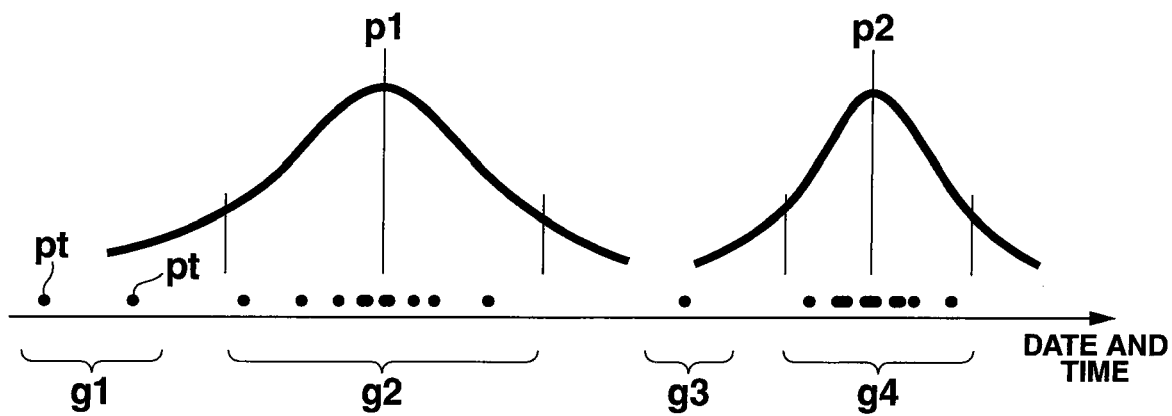
FIG. 3 shows a concept when grouping is performed on the basis of the distribution of shooting dates and times in the embodiment.

FIG. 3 shows a concept when grouping is performed on the basis of the distribution of shooting dates and times to supplement the explanation. In FIG. 3, the horizontal axis represents date and time and black points all indicate shooting timing pt. FIG. 3 shows the distribution of shooting dates and times as a normal distribution, not as a histogram described above. In FIG. 3, two peak places p1, p2 have been determined. FIG. 3 shows an example of setting image data items to four groups g1 to g4.

Specifically, there are many cases where the distribution of shooting locations in taking pictures in a sightseeing area or the like is approximated by a mathematical probability distribution (model distribution), such as a normal distribution, centering on the position of a notable sight. Actually, a Pareto distribution, a Poisson distribution, or a binominal distribution other than a normal distribution may be more suitable. Any of these distributions can be approximated by a normal distribution. The characteristic of the normal distribution is specifically represented by an average value ($\mu$) and variance ($\sigma 2$).

In grouping based on the normal distribution, for example, those whose variance from an average is within a range of $\pm 2\sigma$ or $3\sigma$ may be classified into a group and the rest into another group. In this case, unlike a classification based on the histogram, shooting data lies midway between two peaks separating from each other is treated as another group not belonging to the groups corresponding to the two peaks.

Next, the CPU 20 selects a group as a processing object in chronological order of shooting dates and times (step S110). The CPU 20 determines a minimum rectangular area on the map including the shooting positions of all the image data items belonging to the selected group (step S111).

In this case, the CPU 20 can determine the coordinate positions of four points representing a rectangle on the map by extracting the maximum and minimum values of each of latitude and longitude from GPS information attached to all the image data items in the group.

Next, the CPU 20 calculates the coordinate values of a specific margin for the determined rectangle, for example, of an area whose top, bottom, right, and left sides are enlarged by 10%, searches for the map data stored in the map data memory 29 on the basis of the calculated coordinate value, and acquires map data on the corresponding area (step S112).

The CPU 20 superimposes all the image data items in the group in the corresponding positions in the GPS information in the form of annotated symbolic images on a map image obtained by rendering the acquired map data (step S113).

Suppose, for example, a flag symbol on which a number of an image data item in the order of shooting dates and times in the group is used as an annotated symbolic image. The base of the flagstaff of the symbol is assumed to be caused to align with a shooting location on the map.

After that, the CPU 20 superimposes on the map image a transfer pathway that connects the individual shooting locations on the map in chronological order of shooting dates and times (step S114).

The CPU 20 sets the superimposed image data as an index page of the group, adds a series of page numbers to the index page, then inserts the index page in the electronic photo album recorded in the memory card 32 (step S115).

Next, the CPU 20 configures an image page in which the images in the group are arranged so as to fit in one page in units of a specific number of images, for example, two images, and creates an image page where an annotation, for example, a number in the group, is added to each of the arranged images (step S116).

Then, the CPU 20 adds a series of page numbers following that of the index page to each of the created image pages and inserts them in the electronic photo album recorded in the memory card 32 (step S117).

With that, having completed a series of processes related to the creating and recording of image pages of an electronic photo album in one group, the CPU 20 further determines whether there is an unprocessed group in the memory card 32 (step S118).

If having determined that there is an unprocessed group in the memory card 32, the CPU 20 returns to the process in step S10 to perform the same processes on the unprocessed group.

Figure 4A:
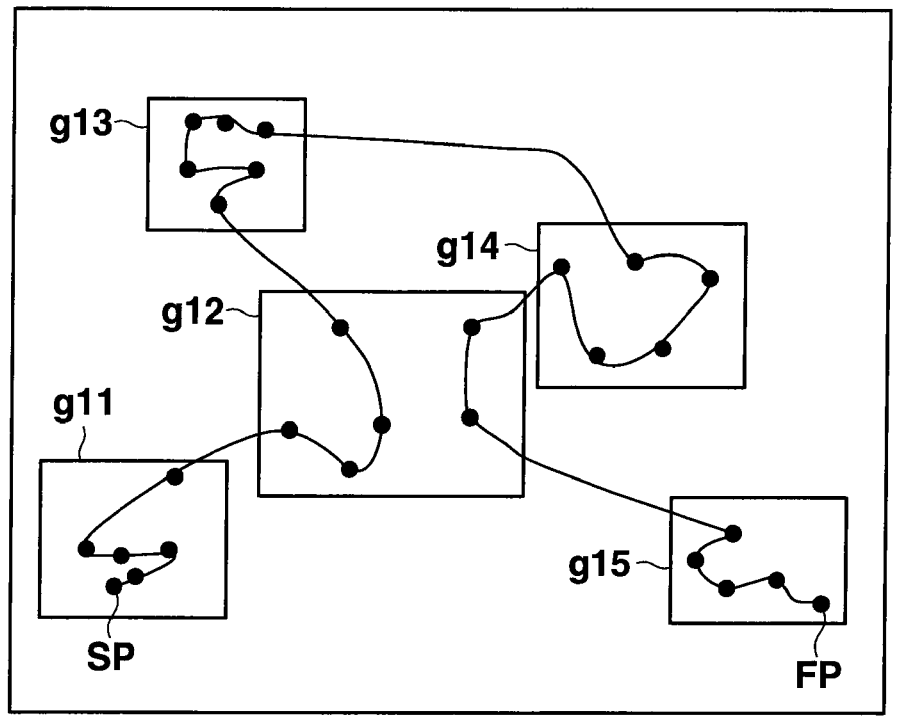
FIG. 4A shows an example of group setting with only a shooting location as a reference in the embodiment.
Figure 4B:
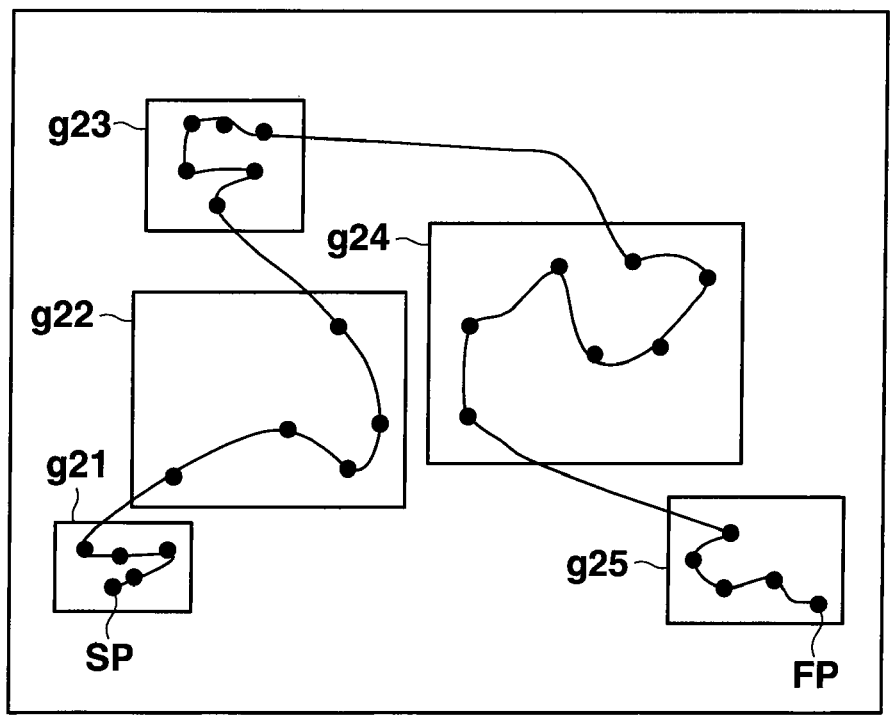
FIG. 4B shows an example of group setting with both a shooting location and a shooting date and time as a reference in the embodiment.

FIGS. 4A and 4B are diagrams to explain the contents of the group setting. Each of FIGS. 4A and 4B shows an example of the movement of a shooting location on the map and group setting. In FIGS. 4A and 4B, each point indicates a shooting location and a line segment that connects points represents a transfer pathway of a user who has the digital camera 10. As shown in FIGS. 4A and 4B, the user moves and takes a picture at the user's discretion from a start point SP to a finish point FP. The contents of FIG. 4A are the same as those of FIG. 4B, except for group setting.

While in the above example, group setting has been performed by only shooting date and time, group setting may be done only by shooting location or by both shooting date and time and shooting location.

As an example of group setting different from the embodiment, the tentative group division using only a shooting position as a reference on the basis of, for example, attached GPS information is shown by rectangles g11 to g15 in FIG. 4A.

As shown in FIG. 4A, since group division is performed, depending on whether shooting locations are nearer or farther away from one another with only a shooting position as a reference, it is seen from shooting dates and time between groups g13 and g14 that the shooting locations shown in group g12 include shooting locations where shooting was done before the user moved to shooting locations in groups g13 and g14 and shooting locations where shooting was done after the user moved to shooting locations in groups g13 and g14.

Therefore, when group g12 is inserted in the electronic photo album in the form of consecutive image pages, the chances are higher that an unnatural editing result will be such that a displayed image page will go against the passage of time.

In contrast, an example of tentative group division is shown by rectangles g21 to g25 in FIG. 4B when both shooting location and shooting date and time are used as a reference according to the processes in the above embodiment.

As shown in FIG. 4B, since group division is performed according to images whose shooting locations are near one another and whose shooting dates and times succeed one another, with both shooting location and shooting date and time as a reference, a very natural editing result is obtained, taking into account the passage of time in the displayed image pages, when each group is inserted in the electronic photo album in the form of consecutive image pages on the basis of groups g21 to g25.

Specifically, the distribution of shooting locations when shooting is done in a sightseeing area correlates closely with the distribution of shooting dates and times, even if group setting is performed by either shooting date and time or shooting location, the group is concentrated in a range where both shooting dates and times and shooting locations are unified to some extent.

However, when the user wants to do group setting, giving priority to either shooting date/time or shooting location, or striking a balance between them, the user may be allowed to select a group setting method as needed.

Next, a concrete example of creating image pages constituting the electronic photo album as described above after a group has been set will be explained with reference to FIG. 5A and FIGS. 5B-1 to 5B-7.

FIG. 5A illustrates shooting locations and a transfer pathway on a map when shooting has been done in a total of nine places from a start point Sp to a finish point FP. Suppose the image data recorded in this way is subjected to group setting in the process of FIG. 2, with shooting location and shooting date and time as a reference, thereby obtaining two groups g31 and g32 as shown in FIG. 5A.

Therefore, after having created an index page for a first page as shown in FIG. 5B-1 for a first group g31, the CPU 20 creates a second and a third image page for the electronic photo album as shown in FIGS. 5B-2 and 5B-3 and records both pages in the memory card 32.

Figures 4, 5B:
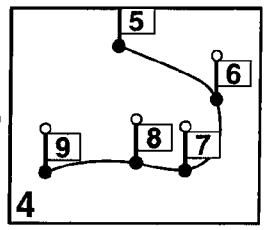
Figures 5, 5B:
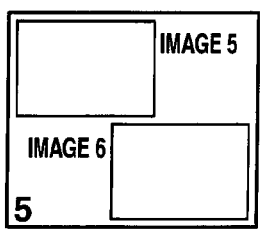

After that, the CPU 20 further creates an index page for a fourth page as shown in FIG. 5B-4 for a second group g32, and then creates a fifth to a seventh image page for the electronic photo album as shown in FIGS. 5B-5, 5B-6 and 5B-7, and records the created pages in the memory card 32.

The CPU 20 performs the process of creating image pages for the electronic photo album explained in steps S110 to S118 of FIG. 2 on each unprocessed group sequentially. When the process performed on the last unprocessed group has been completed, the CPU 20 determines the completion of the process in step S118 and terminates the process of creating the electronic photo album of FIG. 2.

Although not shown in the explanation of FIG. 2, it is conceivable that the number of image data items set in one group may become very large as a result of the number of groups being limited to a specific range. Therefore, after having completed the process of FIG. 2, the CPU 20 may further perform the process of limiting the number of image pages constituting a group.

Figures 5, 5B, 6:
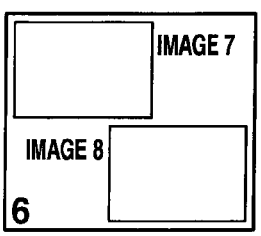

FIG. 6 is a flowchart to explain a hierarchical classification process performed by the CPU 20 when the number of image data items constituting a group is large. In FIG. 6, first, the CPU 20 determines whether there is any group whose number of shot image data items is equal or larger than a specific value, for example, 12 (step S301).

If having determined that there is not such a group, the CPU 20 terminates the process of FIG. 6.

If having determined in step S301 that there is a group whose number of image data items is greater than or equal to the specific value, the CPU 20 performs the electronic photo album creation process explained in FIG. 2 hierarchically on only the image data items in the corresponding group, divides the corresponding group into a plurality of subgroups, and sets the subgroups (step S302).

The CPU 20 may sets the subgroups using attribute information different from that used in classifying the basic group.

Specifically, the CPU 20 may classify the subgroups on the basis of shooting date and time when having classified the basic group on the basis of shooting location or on the basis of a scene or the type of a subject (including personal information on a subject) when having classified the basic group on the basis of both shooting location and shooting date and time.

When setting the subgroups, the CPU 20 creates a map image for an index page for image data items belonging to each of the subgroups and records the map image.

Then, the CPU 20 replaces the individual image pages in the original group in the electronic photo album in the memory card 32 with a plurality of image pages created as lower-level subgroups in the corresponding group and records the lower-level image pages (step S303).

As a result, the CPU 20 not only encloses a rectangular area corresponding to a recorded subgroup at a lower level of hierarchy with a frame on the index page of the corresponding group in the electronic photo album recorded in the memory card 32, but also rewrites a number added to image data belonging to the subgroup so as to combine with the frame and records the resulting data (step S304).

Furthermore, the CPU 20 superimposes an identification annotation representing a subgroup, such as "Sub-Gr. 01," on a map image and records the resulting data on an index page recorded for each subgroup (step S305), thereby completing the hierarchical classification process of FIG. 6.

As described above, in the embodiment, when it has been determined that the number of image data items constituting a group is too large, the group is automatically divided into subgroups at a lower level of hierarchy. A map range of subgroups belonging to the corresponding group is shown on the index page of the group, thereby preventing not only the number of apparent groups from increasing but also the number of image data items belonging to one group from increasing.

In this case, since index pages for subgroups are created and the locations of image data divided into the subgroups can be recognized by identifying them in the index page of a higher-level group, desired image data can be retrieved easily even if it belongs to a subgroup.

Next, an operation when the electronic photo album recorded in the memory card 32 is displayed in the reproduction mode of the digital camera 10 will be explained.

Figures 5, 5B, 6, 7:
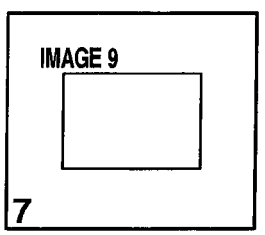
Figure 6:
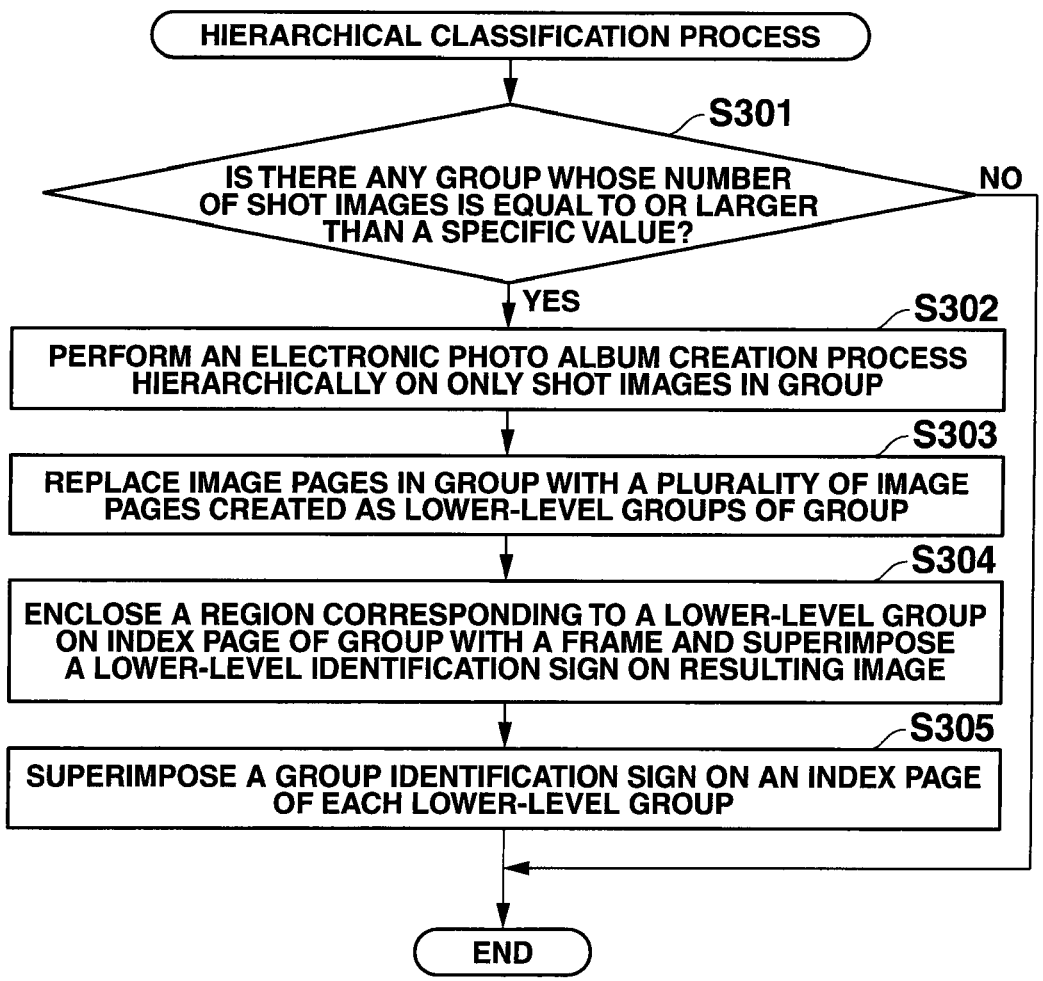
Figure 7:
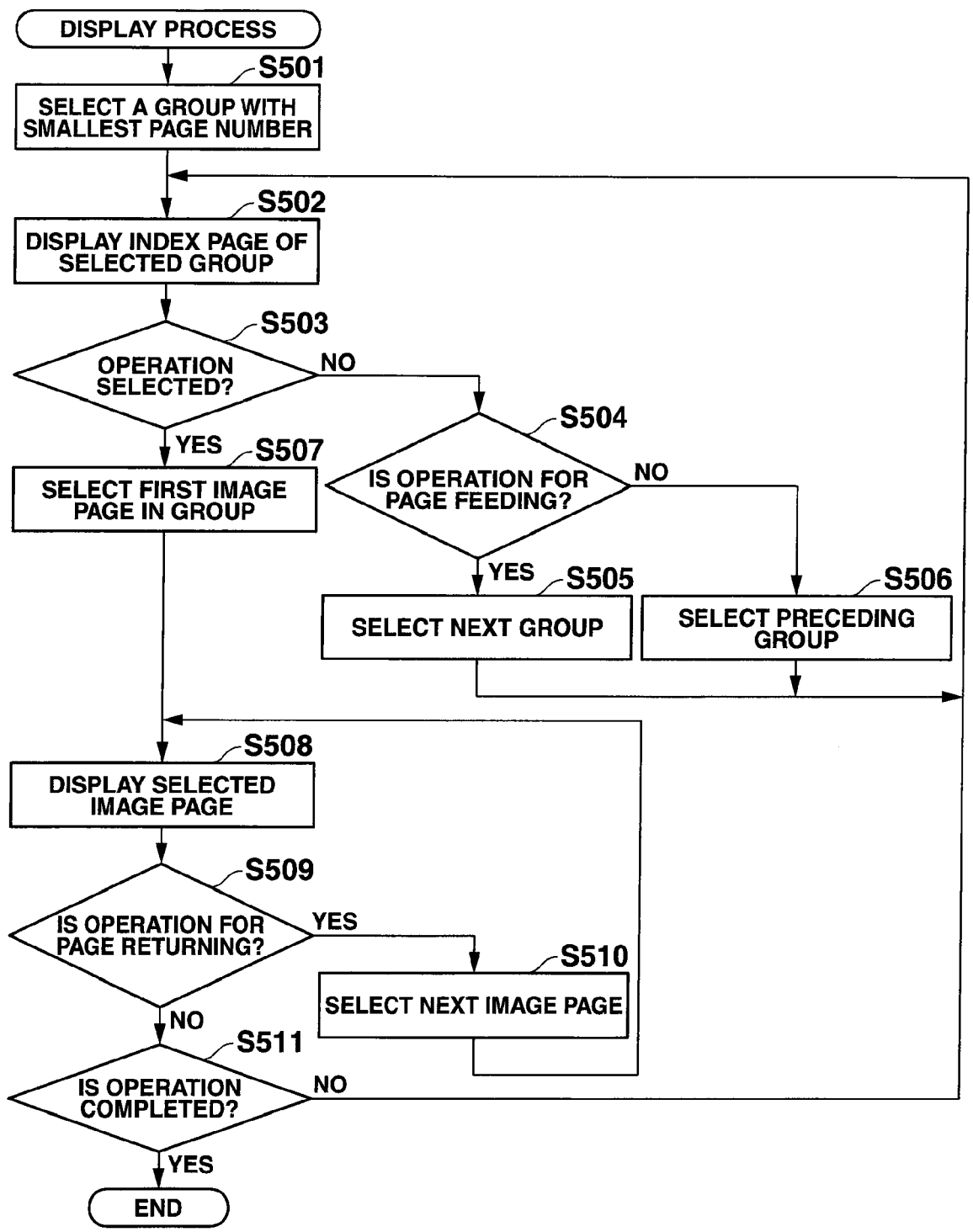

FIG. 7 is a flowchart to explain an electronic photo album display process performed by the CPU 20 when the user selects an electronic photo album recorded in the memory card 32 and specifies display.

First, the CPU 20 selects a group to which the-smallest-page-number-added image page belongs in a file of the specified electronic photo album (step S501), reads image data on an index page in the selected group from the memory card 32, develops the image data on the image processing unit 14, and displays the resulting image data on the display unit 15 (step S502).

At this time, the CPU 20 is supposed to accept only the operation of a set key for selecting image data belonging to the group, the operation of the "→" cursor key for specifying a next group in page feeding on a group basis, or the "←" cursor key for specifying the preceding group in page returning on a group basis at the key operation unit 23 and waits for any one of the keys to be operated.

If having accepted the operation of any one of the keys, the CPU 20 first determines whether what has been operated is the set key and a group that displays an index page at the time has been selected (step S503).

If having determined that what has been operated is not the set key and a group that displays an index page at the time has not been selected, the CPU 20 determines whether what has been operated next is the "→" cursor key and the operation has been for specifying the next group in page feeding (step S504).

If having determined that what has been operated is the "→" cursor key, the CPU 20 determines that the operation has been performed to specify the next group in page feeding, selects an index page serving as the smallest page number from page numbers larger than the currently displayed index page (step S505), and returns again to the processes in step S502 and forward.

If having determined that what has been operated in step S504 is not the "→" cursor key, the CPU 20 determines that what has been operated is the "←" cursor key and a key for specifying the preceding group in page returning has been operated. Then, the CPU 20 selects an index page serving as the largest page number from page numbers smaller than the currently displayed index page (step S506) and returns again to the processes in step S502 and forward.

In this way, the user performs page feeding or page returning with the "→" or "←" cursor key until an index page of a desired group is displayed on the display unit 15. When the page of the desired group has been displayed on the display unit 15, the user operates the set key.

When the set key has been operated, the CPU 20, which determines the operation of the set key in step S503, selects a first image page located next to the index page from a group selected next (step S507), reads the selected image data from the memory card 32, develops the data on the image processing unit 14, and displays the resulting data on the display unit 15 (step S508).

At this time, the CPU 20 is supposed to accept only the operation of the "→" cursor key for specifying a next image page belonging to the group in page feeding on an image basis, the operation of the "↑" cursor for returning to a state where image data in another group in the electronic photo album is to be selected, or the operation of the "↓" cursor key for terminating an image display of the electronic photo album at the key operation unit 23 and waits for any one of the keys to be operated.

If having accepted the operation of any one of the keys, the CPU 20 first determines whether what has been operated is the "→" cursor key (step S509). If what has been operated is the "→" cursor key and a next image page belonging to the group has been specified in page feeding, the CPU 20 selects the next image page in the group (step S510), proceeds to step S508, reads the selected image data from the memory card 32, develops the data on the image processing unit 14, and displays the resulting data on the display unit 15.

In step S509, if what has been operated is not the "→" cursor key, the CPU 20 determines whether what has been operated is the "↓" cursor key and the termination of an image display of the electronic photo album has been specified (step S511).

If what has been operated is not the "↓" cursor key, the CPU 20 determines that what has been operated is the "↑" cursor key and therefore a key operation for returning to a state where image data in another group in the electronic photo album is to be selected has been performed. Then, the CPU 20 returns to the processes in step S502 and forward.

In step S511, if having determined that what has been operated is not the "↑" cursor key, the CPU 20 determines that what has been operated is the "↓" cursor key and therefore a key operation for terminating an image display of the electronic photo album has been performed. Then, the CPU 20 terminates the display process of the electronic photo album in FIG. 7.

As for the display of a group including subgroups at a lower level of hierarchy, when an index page of subgroups is displayed at the same level of hierarchy as that of image data belonging to the group and the set key on the key operation unit 23 is further operated, with the index page of the subgroups being displayed, the CPU 20 determines the operation and proceeds to the operation of displaying image data in the subgroup at the corresponding lower level of hierarchy.

While in the embodiment, image data in the group has been selected by the user's key operation, the corresponding image data may be displayed by pointing at a symbol on a map displayed as an index page by a touch operation on the touch input unit 16 integrally provided on the display unit 15.

As described above, with the embodiment, the grouping of images on the basis of shooting dates and times and shooting locations and the creation of an index page for each group are automated in reproducing an electronic photo album, which makes it possible to easily create an image album whose way of organizing recorded images is natural and easy-to-understand.

The embodiment enables the number of groups to be adjusted by changing conditions of shooting dates and times and shooting locations which serve as a reference in grouping, which makes it possible to adjust the number of groups collected as needed.

In addition, the embodiment limits the number of groups such that the number lies within a preset range, preventing the operation of retrieving desired image data on the basis of its group from becoming complicated, which further improves user-friendliness.

In this case, with the embodiment, on the basis of a histogram of the frequency of shooting per unit time in grouping, a group is set according to a position where a pattern of increases and decreases in shooting frequency reaches a peak. Therefore, a group is set in a very-easy-to-understand way by grouping times when the user did the shooting frequently on the basis of the distribution.

In addition to the above method, the same effect is also produced by calculating shooting density from GPS information showing shooting locations to create a map of shooting densities per unit area when a group is set according to a range adjacent to a position where a pattern of increases and decreases in shooting density reaches a peak.

In the embodiment, as the peak value of the pattern of increases and decreases in shooting frequency (like shooting density) is higher, the time range (or the number of partitions in shooting density) in grouping is supposed to be made larger according to the ratio of the peak values. Therefore, grouping that reflects the user's shooting intention can be realized.

Although not shown in the embodiment, as the time range (or the number of partitions in shooting density) constituting a pattern of increases and decreases in shooting frequency (like shooting density) is greater, the extent is used more positively in dividing a group, which makes it possible to realize the grouping that reflects the user's shooting intention on the basis of the overall distribution tendency.

In addition, with the embodiment, of the divided groups to which information-attached image data items belong, those whose degrees of similarity of the information are higher have serial numbers closer to one another. The serial numbers represent the order of display and are added as page numbers. This helps the user to understand an overall configuration of the photo album.

Furthermore, with the embodiment, since a plurality of image data items are divided into a plurality of groups using, as a reference, the degree of similarity of at least one of information representing shooting date and time and information representing shooting location attached to the image data items, it is possible to realize natural group setting without discomforting the user by selecting the pieces of information serving as a reference, depending on the user's needs.

In this case, the embodiment shows, on the map, a transfer pathway that connects shooting locations in the order of shooting, which realizes a comprehensible index page image in selecting individual image data items.

Although not shown in the embodiment, the image processing unit 14 may extract facial images from image data recorded in the memory card 32 as recognition feature. In addition to this, a feature quantity of the facial part of a person previously set as a specified subject by the user is caused to correspond to an arbitrary priority level. The resulting data may be entered previously in the memory card 32 or in a region provided in the program memory 22.

With this configuration, a plurality of image data items recorded in the memory card 32 can be grouped in a manner that further reflects the user's taste by taking into account the facial recognition result of each image by the image processing unit 14, the feature quantity of the facial part of the person as the previously entered specified subject, and an arbitrary priority level for group division and setting. This improves user-friendliness further.

In the embodiment, as a symbol representing a shooting location, a flag symbol is used on the image of an index page as shown in, for example, FIGS. 5B-1 and 5B-4. The base of the flagstaff is aligned with the shooting location on the map.

The invention does not limit a symbol representing the shooting location to the flag symbol and may use a thumbnail image created from the image data in place of the symbol. Creating an index page where a shooting location can be recognized according to the contents of an image taken there makes it possible to realize an index page image easier to understand in selecting individual data items.

In addition to this, with the embodiment, since the number of an image data item according to the order of shooting dates and times in a group is written on a mark serving as a symbol, this makes it clearer to recognize an image in selecting individual image data items.

Although not shown in the embodiment, when group setting is performed, conditions for further dividing a group may be added such that, for example, image data items differing in date in the shooting date and time information attached to the data items are classified into another group, or that image data items differing in province, such as country, prefecture, city, ward, town, or village, are classified into another group. This makes it possible to perform more natural group setting for the user, depending on shooting conditions.

Although not shown in the embodiment, too, when an image of an index page is displayed, symbols and minified images may be displayed step by step sequentially in the order of shooting dates and times instead of displaying them uniformly.

This adds movement to an image display on the index page, making it easier to understand shooting locations and shooting points.

Although not shown in the embodiment, when an image of an index page is displayed, the CPU 20 may accept the specification of an arbitrary position on the image of the index page, enlarge a map image, centering on the accepted specified position, and display a minified image of image data in a position corresponding to the shooting location on the enlarged map image.

This display form is particularly effective in shooting many images in a narrow range on a map, preventing many images from overlapping one another, which helps individual data items to be selected.

While the embodiment has been applied to a digital camera, the invention is not limited to this and may be realized in the form of an application program to be installed in a digital photoframe, a smartphone, an electronic book reader, or the like.

This invention is not limited to the above embodiment and, in the present and future implementation phase, may be modified variously without departing from the spirit or essential character thereof. In addition, the functions performed in the embodiment may be combined and practiced suitably if at all possible. Furthermore, the embodiment includes inventions of different stages and therefore various inventions can be extracted by combining suitably a plurality of component elements disclosed in the embodiment. For example, if some components are removed from all of the component elements shown in the embodiment, the resulting configuration can be extracted as an invention, provided that effects are obtained.

For example, the invention may be configured as follows.

According to a 1st aspect of the invention, there may be provided an image recording apparatus. The apparatus may comprise: an image recording unit configured to record a plurality of image data items to which shooting information containing shooting locations is added; an image selection unit configured to select, from the image recording unit, a plurality of image data items to be used in creating an electronic photo album; an electronic photo album creation unit configured to arrange each of the image data items selected by the image selection unit on any one of a plurality of pages included in the electronic photo album to create an electronic photo album; a map storage unit configured to store map information; a map range determination unit configured to determine a map range that includes all of the shooting locations of the image data items selected by the image selection unit; a map image creation unit configured to create a map image of a map range determined by the map range determination unit based on the map information; a superimposition unit configured to superimpose symbols representing the shooting locations of the image data items selected by the image selection unit on a map image created by the map image creation unit; and an index page insertion unit configured to insert a map image on which symbols have been superimposed by the superimposition unit into the electronic photo album in the form of an index page of the electronic photo album.

According to a 2nd aspect of the invention, the image recording apparatus may further comprise a group division unit configured to divide the image data items selected by the image selection unit into a plurality of groups based on the shooting information, wherein the electronic photo album creation unit may create an electronic photo album such that consecutive page numbers are added in each of the groups divided by the group division unit, the map range determination unit may determine a map range that includes all the shooting locations of a plurality of image data items included in each of the groups, the map image creation unit may create a map image of the map range determined by the map range determination unit for each group, the superimposition unit may superimpose symbols representing the shooting locations of a plurality of data items included in each of the groups on a map image created by the map image creation unit, and the index page insertion unit may insert a map image superimposed by the superimposition unit such that the map image corresponds to each of the groups at the head of the consecutive page numbers added in each of the groups in the form of an index page of each of the groups in the electronic photo album.

According to a 3rd aspect of the invention, the group division unit may divide the image data items selected by the image selection unit into the plurality of groups using a degree of similarity of the shooting information as a reference.

According to a 4th aspect of the invention, the image recording unit may record a plurality of image data items to which shooting information containing shooting locations and shooting dates and times is added, and the group division unit may divide the image data items selected by the image selection unit into the plurality of groups using, as a reference, a degree of similarity of the shooting dates and times, the shooting locations, or both the shooting dates and times and the shooting locations.

According to a 5th aspect of the invention, the group division unit may cause a user to select shooting information used as a reference for group division.

According to a 6th aspect of the invention, the group division unit may adjust a degree of similarity serving as the reference such that the number of divided groups lies within a specified range to execute the group division.

According to a 7th aspect of the invention, the group division unit may divide shooting dates and times added to the image data items selected by the image selection unit on a unit time basis to execute the group division such that the plurality of groups correspond to dates and times when the distribution of increases and decreases in shooting frequency in each of the divided unit times reaches a peak.

According to an 8th aspect of the invention, the group division unit may increase a time range of a divided group as the peak value of the distribution of increases and decreases in shooting frequency in each of the divided unit times increases.

According to a 9th aspect of the invention, the group division unit may divide shooting locations added to the image data items selected by the image selection unit for each unit region on a map to execute the group division such that the plurality of groups correspond to positions where the distribution of increases and decreases in shooting density in each of the divided unit regions reaches a peak.

According to a 10th aspect of the invention, the group division unit may increase a region range of a divided group as the peak value of the distribution of increases and decreases in shooting density in each divided unit region on the map increases.

According to an 11th aspect of the invention, the image recording apparatus may further comprise a determination unit configured to determine whether the number of image data items belonging to each of the groups divided by the group division unit has exceeded a preset number, wherein, when there is a group determined by the determination unit to have exceeded the preset number, the group division unit may further divide the group into a plurality of subgroups at a lower level of hierarchy, the map range determination unit, map image creation unit, and superimposition unit may further determine a map range, create a map image, and superimpose symbols in accordance with the subgroups, the electronic photo album creation unit may further create an electronic photo album such that consecutive page numbers are added in each of the subgroups divided by the group division unit, and the index page insertion unit may further insert a map image superimposed by the superimposition unit such that the map image corresponds to each of the subgroups at the head of the consecutive page numbers added in each of the subgroups.

According to a 12th aspect of the invention, the superimposition unit may further superimpose a line that connects the superimposed symbols in the order of shooting dates and times of image data items corresponding to individual symbols.

According to a 13th aspect of the invention, the image recording apparatus may further comprise a facial recognition unit configured to recognize a facial part of a person shot in image data, wherein the group division unit may divide the image data items selected by the image selection unit into a plurality of groups using, as a reference, a degree of similarity of the facial part recognized by the facial recognition unit.

According to a 14th aspect of the invention, the superimposition unit may superimpose thumbnail images obtained from the image data items as symbols representing the shooting locations of the image data items.

According to a 15th aspect of the invention, the electronic photo album creation unit may superimpose, on individual pages of the electronic photo album, symbols representing image data items included in the individual pages, respectively, and the superimposition unit may superimpose the symbols representing the image data items as symbols representing the shooting locations of the image data items.

According to a 16th aspect of the invention, the image recording unit may record a plurality of image data items to which shooting information composed of a plurality of items is added, and the group division unit may divide the image data items selected by the image selection unit into groups or subgroups hierarchically based on the items included in the shooting information.

According to a 17th aspect of the invention, the image recording apparatus may further comprise an electronic photo album display unit configured to display individual pages included in the electronic photo album in the order of page numbers added to the individual pages.

According to an 18th aspect of the invention, the electronic photo album display unit, when displaying the index page, may display thumbnail images corresponding to the image data items in a group corresponding to the index page in positions corresponding to shooting locations on the index page in the order of shooting dates and times.

According to a 19th aspect of the invention, the electronic photo album display unit, when an arbitrary position on the index page is specified by a user in displaying the index page, may display an image data item corresponding to the specified position.

According to a 20th aspect of the invention, there may be provided an image recording method applied to an image recording apparatus including an image recording unit configured to record a plurality of image data items to which shooting information containing shooting locations is added and a map storage unit configured to store map information. The method may comprise: executing an image selection process of selecting, from the image recording unit, a plurality of image data items to be used in creating an electronic photo album; executing an electronic photo album creation process of arranging each of the image data items selected by the image selection process on any one of a plurality of pages included in the electronic photo album to create the electronic photo album; executing a map range determination process of determining a map range that includes all of the shooting locations of the image data items selected by the image selection process; executing a map image creation process of creating a map image of a map range determined by the map range determination process based on the map information; executing a superimposition process of superimposing symbols representing the shooting locations of the image data items selected by the image selection process on a map image created by the map image creation process; and executing an index page insertion process of inserting a map image on which symbols have been superimposed by the superimposition process into the electronic photo album in the form of an index page of the electronic photo album.

According to a 21th aspect of the invention, there may be provided a non-transitory computer-readable storage medium having program code stored thereon for controlling a computer operable as an image recording apparatus including an image recording unit configured to record a plurality of image data items to which shooting information containing shooting locations is added and a map storage unit configured to store map information. The program code may comprise: executing an image selection process of selecting, from the image recording unit, a plurality of image data items to be used in creating an electronic photo album; executing an electronic photo album creation process of arranging each of the image data items selected by the image selection process on any one of a plurality of pages included in the electronic photo album to create the electronic photo album; executing a map range determination process of determining a map range that includes all of the shooting locations of the image data items selected by the image selection process; executing a map image creation process of creating a map image of a map range determined by the map range determination process based on the map information; executing a superimposition process of superimposing symbols representing the shooting locations of the image data items selected by the image selection process on a map image created by the map image creation process; and executing an index page insertion process of inserting a map image on which symbols have been superimposed by the superimposition process into the electronic photo album in the form of an index page of the electronic photo album.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recording apparatus comprising:
   an image recording unit configured to record a plurality of image data items to which shooting information containing shooting locations is added;
   an image selection unit configured to select, from the image recording unit, a plurality of image data items to be used in creating an electronic photo album;
   an electronic photo album creation unit configured to arrange each of the image data items selected by the image selection unit on any one of a plurality of pages included in the electronic photo album to create an electronic photo album;
   a map storage unit configured to store map information;
   a map range determination unit configured to determine a map range that includes all of the shooting locations of the image data items selected by the image selection unit, such that a size of the map range varies in accordance with the shooting locations of the image data items selected by the image selection unit;
   a map image creation unit configured to create a map image of the map range determined by the map range determination unit based on the map information;
   a superimposition unit configured to superimpose symbols representing the shooting locations of the image data items selected by the image selection unit on the map image created by the map image creation unit; and
   an index page insertion unit configured to insert the map image on which symbols have been superimposed by the superimposition unit into the electronic photo album in the form of an index page of the electronic photo album.

2. The image recording apparatus according to claim 1, further comprising a group division unit configured to divide the image data items selected by the image selection unit into a plurality of groups based on the shooting information, wherein:
   the electronic photo album creation unit creates the electronic photo album such that consecutive page numbers are added in each of the groups divided by the group division unit,
   the map range determination unit determines a map range that includes all the shooting locations of a plurality of image data items included in each of the groups,
   the map image creation unit creates a map image of the map range determined by the map range determination unit for each group,
   the superimposition unit superimposes symbols representing the shooting locations of the plurality of image data items included in each of the groups on the map image created by the map image creation unit for the group, and
   the index page insertion unit inserts the map image on which symbols have been superimposed by the superimposition unit for each of the groups such that the map image corresponding to each of the groups is at the head of the consecutive page numbers added in the group in the form of an index page of the group in the electronic photo album.

3. The image recording apparatus according to claim 2, wherein the group division unit divides the image data items selected by the image selection unit into the plurality of groups using a degree of similarity of the shooting information as a reference.

4. The image recording apparatus according to claim 3, wherein:
the image recording unit records a plurality of image data items to which shooting information containing shooting locations and shooting dates and times is added, and
the group division unit divides the image data items selected by the image selection unit into the plurality of groups using, as a reference, a degree of similarity of the shooting dates and times, the shooting locations, or both the shooting dates and times and the shooting locations.

5. The image recording apparatus according to claim 4, wherein the group division unit causes a user to select shooting information used as a reference for group division.

6. The image recording apparatus according to claim 3, wherein the group division unit adjusts a degree of similarity serving as the reference such that the number of divided groups lies within a specified range to execute the group division.

7. The image recording apparatus according to claim 6, wherein the group division unit divides shooting dates and times added to the image data items selected by the image selection unit on a unit time basis to execute the group division such that the plurality of groups correspond to dates and times when a distribution of increases and decreases in shooting frequency in each of the divided unit times reaches a peak.

8. The image recording apparatus according to claim 7, wherein the group division unit increases a time range of a divided group as the peak value of the distribution of increases and decreases in shooting frequency in each of the divided unit times increases.

9. The image recording apparatus according to claim 6, wherein the group division unit divides shooting locations added to the image data items selected by the image selection unit for each unit region on a map to execute the group division such that the plurality of groups correspond to positions where a distribution of increases and decreases in shooting density in each of the divided unit regions reaches a peak.

10. The image recording apparatus according to claim 9, wherein the group division unit increases a region range of a divided group as the peak value of the distribution of increases and decreases in shooting density in each divided unit region on the map increases.

11. The image recording apparatus according to claim 2, further comprising a determination unit configured to determine whether the number of image data items belonging to each of the groups divided by the group division unit has exceeded a preset number,
wherein:
when there is a group determined by the determination unit to have exceeded the preset number, the group division unit further divides the group into a plurality of subgroups at a lower level of hierarchy,
the map range determination unit, map image creation unit, and superimposition unit further determine a map range, create a map image, and superimpose symbols in accordance with the subgroups,
the electronic photo album creation unit further creates the electronic photo album such that consecutive page numbers are added in each of the subgroups divided by the group division unit, and
the index page insertion unit further inserts a map image on which symbols have been superimposed by the superimposition unit for each of the subgroups such that the map image corresponding to each of the subgroups is at the head of the consecutive page numbers added in the subgroup.

12. The image recording apparatus according to claim 1, wherein the superimposition unit further superimposes a line that connects the superimposed symbols in the order of shooting dates and times of image data items corresponding to individual symbols.

13. The image recording apparatus according to claim 2, further comprising a facial recognition unit configured to recognize a facial part of a person shot in image data, wherein the group division unit divides the image data items selected by the image selection unit into a plurality of groups using, as a reference, a degree of similarity of the facial part recognized by the facial recognition unit.

14. The image recording apparatus according to claim 1, wherein the superimposition unit superimposes thumbnail images obtained from the image data items as the symbols representing the shooting locations of the image data items.

15. The image recording apparatus according to claim 1, wherein:
the electronic photo album creation unit superimposes, on individual pages of the electronic photo album, symbols representing image data items included in the individual pages, respectively, and
the superimposition unit superimposes the symbols representing the image data items as the symbols representing the shooting locations of the image data items.

16. The image recording apparatus according to claim 2, wherein:
the image recording unit records a plurality of image data items to which shooting information composed of a plurality of items is added, and
the group division unit divides the image data items selected by the image selection unit into groups or subgroups hierarchically based on the items included in the shooting information.

17. The image recording apparatus according to claim 2, further comprising an electronic photo album display unit configured to display individual pages included in the electronic photo album in the order of page numbers added to the individual pages.

18. The image recording apparatus according to claim 17, wherein the electronic photo album display unit, when displaying the index page, displays thumbnail images corresponding to the image data items in a group corresponding to the index page in positions corresponding to the shooting locations on the index page in the order of shooting dates and times.

19. The image recording apparatus according to claim 17, wherein the electronic photo album display unit, when an arbitrary position on the index page is specified by a user in displaying the index page, displays an image data item corresponding to the specified position.

20. An image recording method for an image recording apparatus including an image recording unit configured to record a plurality of image data items to which shooting information containing shooting locations is added and a map storage unit configured to store map information, the method comprising:

executing an image selection process of selecting, from the image recording unit, a plurality of image data items to be used in creating an electronic photo album;

executing an electronic photo album creation process of arranging each of the image data items selected by the image selection process on any one of a plurality of pages included in the electronic photo album to create the electronic photo album;

executing a map range determination process of determining a map range that includes all of the shooting locations of the image data items selected by the image selection process, such that a size of the map range varies in accordance with the shooting locations of the image data items selected by the image selection unit;

executing a map image creation process of creating a map image of the map range determined by the map range determination process based on the map information;

executing a superimposition process of superimposing symbols representing the shooting locations of the image data items selected by the image selection process on the map image created by the map image creation process; and executing an index page insertion process of inserting the map image on which symbols have been superimposed by the superimposition process into the electronic photo album in the form of an index page of the electronic photo album.

21. A non-transitory computer-readable storage medium having program code stored thereon for controlling a computer operable as an image recording apparatus including an image recording unit configured to record a plurality of image data items to which shooting information containing shooting locations is added and a map storage unit configured to store map information, to perform functions comprising:

executing an image selection process of selecting, from the image recording unit, a plurality of image data items to be used in creating an electronic photo album;

executing an electronic photo album creation process of arranging each of the image data items selected by the image selection process on any one of a plurality of pages included in the electronic photo album to create the electronic photo album;

executing a map range determination process of determining a map range that includes all of the shooting locations of the image data items selected by the image selection process, such that a size of the map range varies in accordance with the shooting locations of the image data items selected by the image selection unit;

executing a map image creation process of creating a map image of the map range determined by the map range determination process based on the map information;

executing a superimposition process of superimposing symbols representing the shooting locations of the image data items selected by the image selection process on the map image created by the map image creation process; and executing an index page insertion process of inserting the map image on which symbols have been superimposed by the superimposition process into the electronic photo album in the form of an index page of the electronic photo album.

* * * * *